United States Patent
Armstrong et al.

(10) Patent No.: US 6,209,024 B1
(45) Date of Patent: Mar. 27, 2001

(54) METHOD AND APPARATUS FOR ACCESSING AN ARRAY OF DATA STORAGE DEVICES BY SELECTIVELY ASSIGNING USERS TO GROUPS OF USERS

(75) Inventors: James B. Armstrong, Princeton, NJ (US); Robert G. Dandrea, Newtown, PA (US)

(73) Assignee: DIVA Systems Corporation, Menlo Park, CA (US)

( * ) Notice: Subject to any disclaimer, the term of this patent is extended or adjusted under 35 U.S.C. 154(b) by 0 days.

(21) Appl. No.: 09/286,335

(22) Filed: Apr. 5, 1999

(51) Int. Cl.[7] .......................... G06F 15/167; G06F 12/00

(52) U.S. Cl. .................. 709/212; 711/100; 711/112; 711/114

(58) Field of Search ................................ 709/216, 212; 711/100, 112, 114

(56) References Cited

U.S. PATENT DOCUMENTS

| | | | |
|---|---|---|---|
| 5,414,455 | * 5/1995 | Hopper et al. | 348/7 |
| 5,465,343 | * 11/1995 | Henson et al. | 711/112 |
| 5,915,094 | * 6/1999 | Kouloheris et al. | 345/327 |
| 5,974,441 | * 10/1999 | Rogers et al. | 709/200 |

* cited by examiner

*Primary Examiner*—Krisna Lim
(74) *Attorney, Agent, or Firm*—Thomason, Moser and Patterson

(57) ABSTRACT

A method of accessing an array of storage devices comprising the steps of analyzing a data request from a user to determine the optimal storage device from which data should be retrieved, assigning the user to a first group of users that will access the optimal storage device in a first time period, retrieving data to fulfill the data request from the optimal storage device, and buffering the data in a buffer. Thereafter, the method assigns the user to a second group of users that will be supplied data from the buffer in a second time period, and then retrieving the data from the buffer and transmitting the data to the user to fulfill the data request.

36 Claims, 10 Drawing Sheets

METHOD AND APPARATUS FOR ACCESSING AN ARRAY OF DATA STORAGE DEVICES BY SELECTIVELY ASSIGNING USERS TO GROUPS OF USERS

BACKGROUND OF THE DISCLOSURE

1. Field of the Invention

The invention relates to a system for storing and accessing electronic data. More particularly, the invention relates to a method and apparatus for enabling multiple users to independently access previously stored streams of electronic data from an array of data storage devices.

2. Description of the Prior Art

In traditional electronic data storage and retrieval systems, the data is stored in a bank or array of memory elements controlled by a central processing unit (CPU). Such data storage systems form the basis of most contemporary computer systems. Typically, the memory elements are a combination of semiconductor memory, such as dynamic random access memory (DRAM) or static random access memory (SRAM), and rotating disk magnetic memory (disk drive memory), such as a "Winchester" hard disk drive. The semiconductor memory is used for storage of data that requires immediate access by the CPU, while the disk drive memory is typically used for storing data that is less frequently accessed by the CPU.

In a multimedia server that uses an array of disk drives for bulk storage of information, there are many variables that must be optimized to achieve an optimal transfer of information from the server to a plurality of independent clients (users) of the server. First, an optimal number of individual disk drives in the array must be chosen to support the maximum expected number of users. Since the cost associated with disk drives is a substantial portion of the total cost of the server, it is critical that the number of disk drives be minimized without substantially impacting performance.

To ensure that the data is continuously transferred from the system to the users, a relatively large capacity semiconductor memory is utilized to buffer the parallel output data streams from the disk drives. Such data buffering is especially necessary when the data is video or audio data that can not be interrupted during transfer to the users for viewing or processing. In such systems, the video and audio data is transferred from the disk drives to the buffer memory as distinct blocks of data. The blocks are serially arranged in the buffer memory such that as the buffer memory is read, the blocks form a contiguous data stream for each user. The substantial cost of semiconductor memory requires that the amount of memory be minimized without impacting the performance of the server.

For example, in a multimedia information storage system, the buffer memory must be very large and, as such, very costly. For example, in a round-robin type access system having M users, buffer memory must temporarily store a given user's data while the other M-1 users are serviced by the server. In a typical video storage system, where 500 kbyte blocks of data is simultaneously read from multiple disk drives for 1000 clients, the buffer memory must be approximately 1–3 Gbytes. Such a large capacity semiconductor memory array is extremely costly.

Another variable that must be optimized is latency, i.e., the delay between when a user requests information and when the server is capable of beginning the information transfer to the user. When the server is used as a video-on-demand server, it is important to minimize latency such that the system users do not experience undo delay when video playback control requests are sent to the server. For example, an excessive delay when a user requests that the system change from a play function to a fast forward or rewind function would be unacceptable. As such, it is important to minimize latency by rapidly executing requests as soon as they are received by the server.

Lastly, the resolution into a file (i.e., file access granularity) needs to be maximized. For example, if a user requests output data starting at a certain position in a file, but the server is able only to deliver data starting at a nearby file position g bytes away from the requested position. As such, the server's minimum guaranteed file resolution is at least g bytes. It is, of course, desirable to maximize the server's file resolution (i.e., to minimize g).

These variables (resolution, latency, buffer memory requirements, continuous data transmission requirements, and the like) can be addressed by altering the extent size used to store and access data. An extent is the amount of data that is read from a disk drive during each disk access. However, a trade-off must be addressed when extent size is increased or decreased, i.e., lengthening the extent size detrimentally impacts the latency and resolution.

Therefore, a need exists in the art for a multiple user data distribution system that balances the foregoing variables (i.e., balances the trade off between longer extent sizes and reasonable latency and resolution) to provide an improved method and apparatus for storing and accessing information in a data storage array.

SUMMARY OF THE INVENTION

The present invention advantageously overcomes the disadvantages heretofore associated with the prior art by utilizing a method and apparatus for optimally accessing an array of storage devices and optimally transmitting the data to the users. The array of storage devices is divided into parity groups of devices (e.g., G devices) such that blocks of data are stored on G-1 devices and the parity data is stored on the other device. In this manner, during a first service period, data is recalled from the entire parity group, checked for errors, corrected if necessary, and stored in a buffer. During the next service period, the buffered data from the group of devices is then supplied to the user in sequential order to ensure a continuous stream of data.

More specifically, the invention analyzes each data request from a user to identify an optimal storage device from which data should be retrieved to fulfill a user's request. If the optimal storage device can be accessed in the present service period, the data from the optimal device is retrieved and buffered. When data is retrieved, data from an entire parity group of storage devices is retrieved such that the data can be checked for errors and, if errors are found, the data can be corrected using the parity data. The corrected data is stored in the buffer. During the next service period, the data from the buffer is transmitted to the user.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
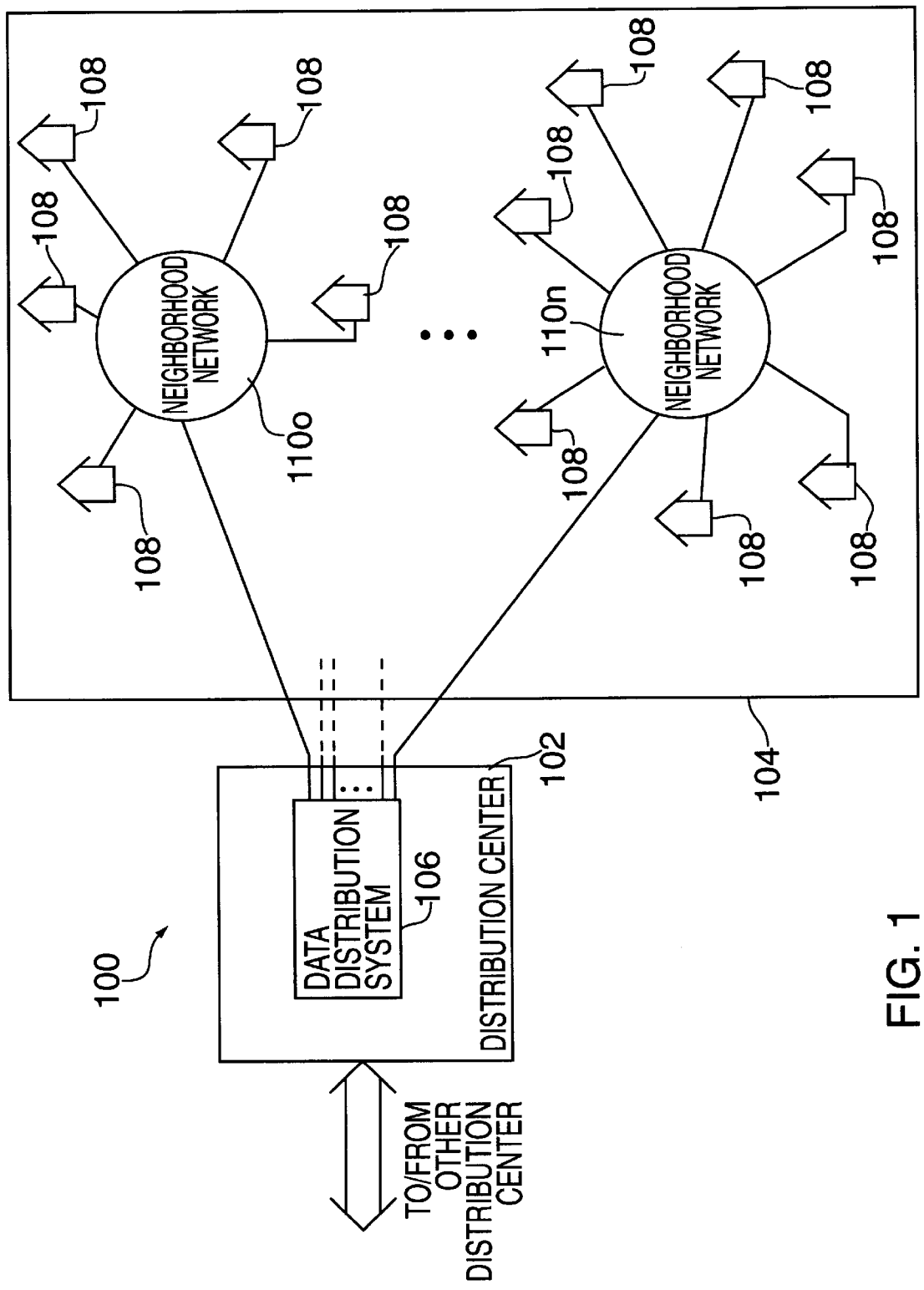
FIG. 1 depicts a high level block diagram of a multiple user data distribution and delivery system.

FIG. 1 depicts a high level block diagram of a multiple user data distribution and delivery system 100. The overall system contains two distinct system elements; a distribution center 102 having a data storage, retrieval and distribution system 106, and a data delivery network 104 having a "hub and spoke" network arrangement. Generally, the data delivery network 104 contains a plurality of users 108 linked to a neighborhood network $110_n$ (where n is an integer 0, 1, 2, 3, . . . N). Each network forms a conventional data distribution hub. The data link from the data distribution system to the neighborhood networks $110_n$ is typically a high speed, time-division-multiplexed link. The neighborhood networks are generally hybrid fiber-coax networks that carry data using a conventional transport protocol such as MPEG-2 or asynchronous transfer mode (ATM). Each user 108 is capable of demultiplexing the data from the neighborhood network 110 such that the users 108 can then decode the serial data streams which they had previously requested from the data distribution system 106. Additionally, the units 108 control, via command links to the data distribution system 106, the data flow and the type of data that they each receive.

The data distribution system 106 within the distribution center 102 processes commands received from a plurality of users 108. The data distribution system 106 interprets and implements the commands. The data delivery network 104 could be created and operated by the local telephone system, the local cable company, or some other service provider organization as well as a combination of systems and/or service providers. Alternatively, the data delivery network 104 could form a bus arrangement, as in an Ethernet-style local area network, wide area network, INTERNET, INTRANET or cable television distribution feeder. In cases where users are near the distribution center, the data delivery network 104 could be replaced by direct connections between the users 108 and the data distribution system 106. The data delivery network 104 does not form a portion of the present invention and is generally described only to provide the reader with an illustration of the use of the invention.

Suffice it to say that the inventive data distribution system 106 sends data to the data delivery network 104 in a compatible data format to facilitate distribution of data to the users 108. One illustrative example of a use for the inventive data distribution system 106 is within a video-on-demand (VOD) system. Although, in the broadest sense, the inventive data distribution system 106 can distribute any type of digital data, e.g., audio information, video information, textual information, graphics, and the like, to simplify the description of the invention, the following discussion will focus upon using the invention within a VOD system having a large number of clients (viewers or users).

In a VOD system, the users 108 have interface units that enable each client to select a video program such as a movie or other multimedia program and control playback of that program using video tape player-like control functions. Specifically, a user, by manipulating an input device connected to an interface unit, can play, pause, stop, fast-forward, fast-fast-forward, reverse, and fast-reverse the program at any time. The data distribution system 106 rapidly processes and implements each user command. Importantly, every user of the system can simultaneously utilize the same control features on any number of programs. Thus, each viewer considers their interface unit (user terminal) as a video tape player capable of accessing a large database of video programming.

The data distribution system 106 contains certain apparatus and concomitant methods for implementing the user commands with unnoticeable delay. Typically, once the command has been implemented, the requested data is transmitted onto one of a plurality of networks $110_n$ by the distribution center 102 in a multiplexed format. The user 108 demultiplexes the data streams and decodes the data for use (display) by the user terminal to a viewer. The data may be sent in digital format or, in some cases, converted to an analog signal for use by the user's equipment (e.g., an analog television).

Figure 2:
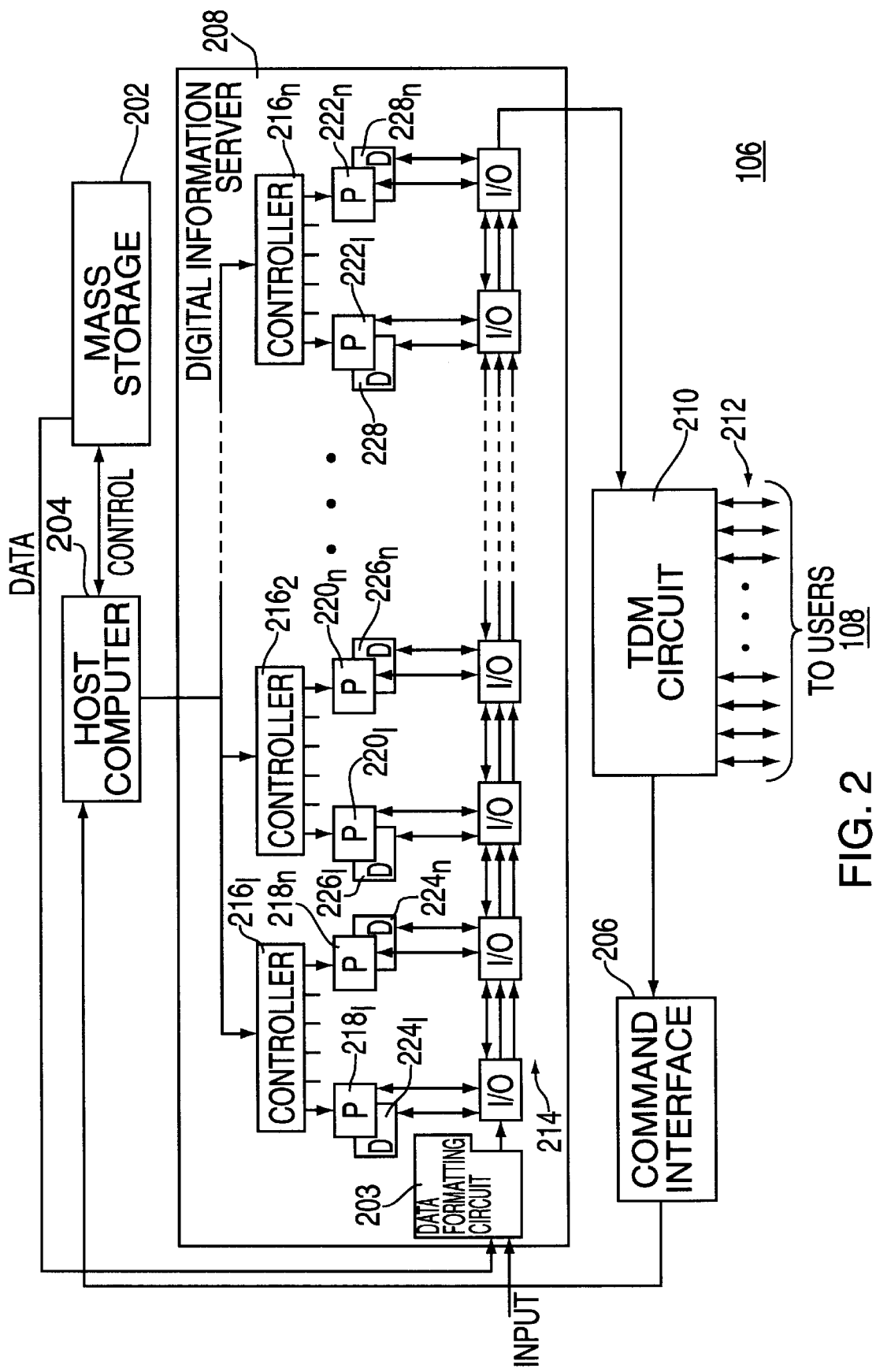
FIG. 2 shows a high level block diagram of a multiple user data distribution system.

FIG. 2 depicts a high level block diagram of the multiple user data distribution system 106 shown in FIG. 1. The system contains a mass storage device 202, a host computer 204, a command interface 206, a digital information server 208, and a data multiplexing circuit 210. In general, a plurality of users (not shown) are sent, via lines 212, multiplexed serial information. Each line represents a multiplexed channel that is connected to the plurality of users via the neighborhood networks.

The users control the operation of the data distribution system 106 via a command link. The command link is assumed to be imbedded within the full-duplex user lines 212; however, the command link could be implemented using a communications channel or network that is different from the network used to deliver the information content to the users. The specific implementation of the command link is typically defined by the data delivery system. Each command from the command link is interpreted by the command interface 206. The command interface 206 reformats the commands from the data delivery system into a command format that can be understood by the host computer 204. Using the command link, a user has the capability of selecting a video program, e.g., a selected multimedia program, and thereafter starting, stopping, pausing, reversing, and fast-forwarding the video program. In other words, the VOD system provides to each user functions that are similar to those available on a conventional video cassette player.

In operation, when a user requests information, e.g., a selected multimedia stream, the host computer 204 retrieves the information from mass storage device 202 (for example, a magneto-optical disk library) and distributes the retrieved information to the digital information server 208. The server contains local memory (a disk drive array) that stores the information. If the information that is requested by the user is presently stored in the server, then the mass storage 202 need not be accessed. Since a large amount of data is stored within local memory, retrieving data from the mass storage 202 occurs infrequently.

More specifically, the digital information server 208 is, in a general sense, a parallel processing computer having a multiple data stream (SIMD) architecture. Specifically, the server 208 contains a plurality of controllers $216_n$, and, associated with each controller, a plurality of processor subsystems $218_n$, $220_n$ and $222_n$. Each processor subsystem is connected to an associated mass storage device, such as Winchester-type disk drive $224_n$, $226_n$, and $228_n$. Those skilled in the art should note that other forms of mass storage, e.g., optical disk drives, random access memory and the like, could be used instead of the magnetic disk drives. As such, the magnetic disk drives shown and described as part of the preferred embodiment of the invention should be considered illustrative of the type of mass storage that could be used.

The mass storage device 202 is generally one or more magneto-optical disk drives or other data storage source. Data from the mass storage device 202 is distributed amongst the disk drives within server 208 via a data formatting circuit 203 and input/output (I/O) circuitry 214. The data formatting circuit 203 performs two functions. The first function buffers incoming data from the mass storage device 202 such that various segments of the incoming data can be reordered and stored simultaneously into the disk drives. The second function performed by circuit 203 is to reformat and buffer digitized "off the air" or live broadcasts such that these broadcasts can be stored within server 208. As such, once stored, these broadcasts can be viewed by users at any time in the future.

The I/O circuitry 214 combines the parallel output data from the processor subsystems $218_n$, $220_n$, . . . , $222_n$ into a 128-bit wide output serial bit stream (described in detail below). Throughout this disclosure, the system illustratively processes 64-bit wide input serial bit streams and produces 128-bit wide output bit streams. However, those skilled in the art will realize from the discussions herein that any other width bit streams, e.g., 128-bit wide serial bit streams, are also within the scope of this invention.

Also, the I/O circuitry contains interprocessor communications circuits that facilitate dynamic allocation of the users to the processors as well as data error detection and correction. The specific details of the I/O circuitry are provided below with respect to FIG. 3.

Lastly, the 128-bit wide serial output data stream from the I/O circuitry 214 is transferred to the multiplexing circuit 210. The multiplexing circuit 210 then reformats the serial data in a multiplexed manner such that a large number of clients, e.g., 3000 clients, can be connected to the various ports 212 of the multiplexing circuit. In other words, the multiplexing circuit rearranges the serial output data stream into a plurality of multiplexed channels (each channel is represented by a port).

Illustratively, in a practical implementation of the data distribution system, there are 128 processor subsystems, e.g., processor subsystems $218_1$ through $218_{128}$, connected to each controller, e.g., controller $216_1$. Physically, a controller and its 128 processor subsystems are mounted on a single circuit card. Each card contains 32 processor subsystem integrated circuits each including four processors. The server contains a total of four circuit cards; thus, a total of 512 processors are contained in the server. Each of the four processors is associated with various processor support circuitry, e.g., memory, instruction logic, I/O circuitry and the like, to produce four processor subsystems on each integrated circuit. The circuit cards are connected to one another via the host computer 204. The host computer 204 generally serves as an interface between the processor subsystems and the users. Additionally, the host computer functions as a main controller that monitors and controls the operation of the various controllers and processor subsystems within the digital information server 208. Those skilled in the art will realize that the number of processors used is application specific and that the number of processors in a parallel processing computer can easily be scaled up or down to fulfill a specific application for the computer. Therefore, it should be understood that the invention disclosed herein can be used in a server having any number of processors that are arranged within the server in any manner.

Figure 3:
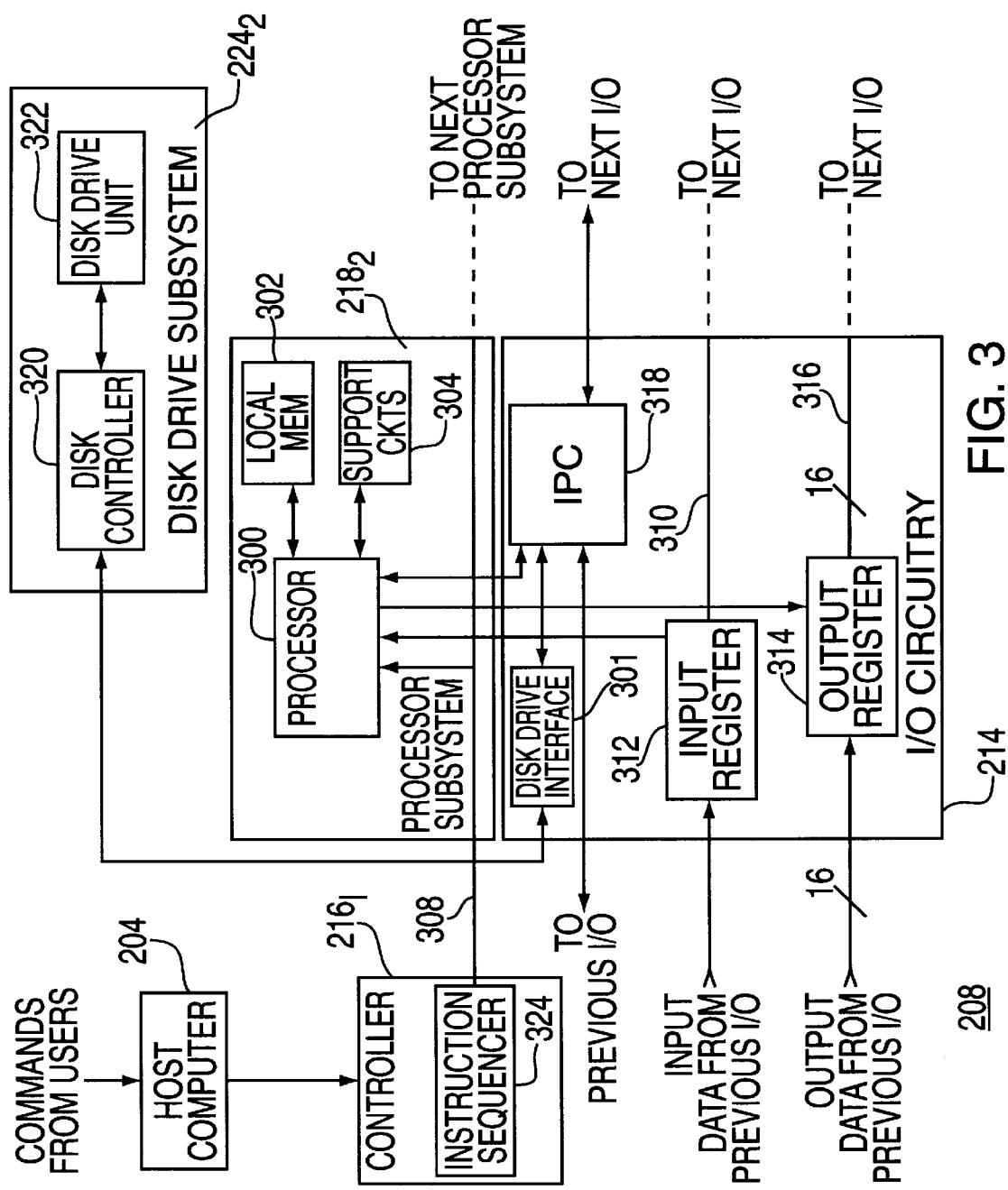
FIG. 3 depicts a detailed block diagram of a portion of the data distribution system shown in FIG. 2.

More specifically, FIG. 3 is a detailed block diagram of a portion of the digital information server 208 shown in FIG. 2. FIG. 3 depicts the details of a processor subsystem $218_2$ and a portion of the I/O circuitry 214 as well as the disk drive $224_2$ and the controller $216_1$. As discussed above, each processor subsystem contains a processor 300 as well as local memory 302 and various well-known processor support circuits 304. Also associated with each processor subsystem is I/O circuitry 214. As directed by instructions carried on the instruction bus 308, the processor performs arithmetic or logical operations on data received from the I/O circuitry 214.

More specifically, the processor 300 is supplied with input data via the input bus 310. The data is temporarily stored in an input register 312 until used by the processor. The input registers operate as conventional shift registers such that, upon each clock cycle, the system serially transfers a word of data (16-bits) from one processor subsystem to the next. The processor loading function is facilitated by a particular processor instruction sent, along bus 308, from the controller $216_1$.

The I/O circuitry also contains one or more output registers 314, an input register 312, a portion of the interprocessor communications (IPC) bus 318, and a disk drive interface 301. The output registers 314 are 16-bit wide registers connected to an output port of the processor, e.g., each register accepts 16-bits of parallel data and outputs 16-bits of parallel data. The output registers form a portion of an output timing sequencer (OTS) that combines the 16-bit output data of each processor with the output data of three other processors to produce a 64-bit wide data element. Each processor may communicate with neighboring processors via the interprocessor communications bus (IPC) bus 318. The IPC bus is a circuit arrangement that permits data and other information to be transferred from one processor to another. The IPC is bi-directional such that information can be passed in both directions along the bus. The specific implementation of the IPC bus is not important to the invention. Those skilled in the art will realize that any bus that enables the processors to share information would be appropriate. One such IPC bus is contained in a parallel processing computer known as the Sarnoff Engine that has been designed by the David Sarnoff Research Center of Princeton, N.J. The Sarnoff Engine is disclosed in a United States patent entitled "Processor For A Parallel Computing System", U.S. Pat. No. 5,579,527, issued Nov. 26, 1996. This patent is incorporated herein by reference.

The disk drive interface 301 connects the disk drive subsystem $224_2$ to the I/O circuitry 214. As such, the disk drive interface 301 performs a serial to parallel conversion of the information from the disk to the processor and vice versa.

Each processor subsystem $218_2$ is indirectly connected (through the IPC bus and a disk drive interface) to a disk drive subsystem $224_2$ containing a disk controller 320 and a disk drive unit 322. The disk controller 320 executes commands from the processor 300 to transfer data from the disk drive unit 322 to the processor. Since the processors and disk drives may be physically distant from one another, the electrical connection between each of the disk controllers and their associated processors is typically implemented by a bit-serial, bi-directional data bus.

Each processor receives identical instructions from the instruction sequencer 324 within the controller $216_1$. The instruction sequencer 324 stores a sequence of instructions forming a program to be executed by each of the processors. This sequence of instructions is pre-loaded into the sequencer by the host computer 204. The particular process by which the program is loaded and executed is well-known in the art and requires no further discussion.

Of course, the foregoing is merely an example of one illustrative implementation of the digital information server. From the following discussion, those skilled in the art will realize that other implementations are possible.

Figure 4:
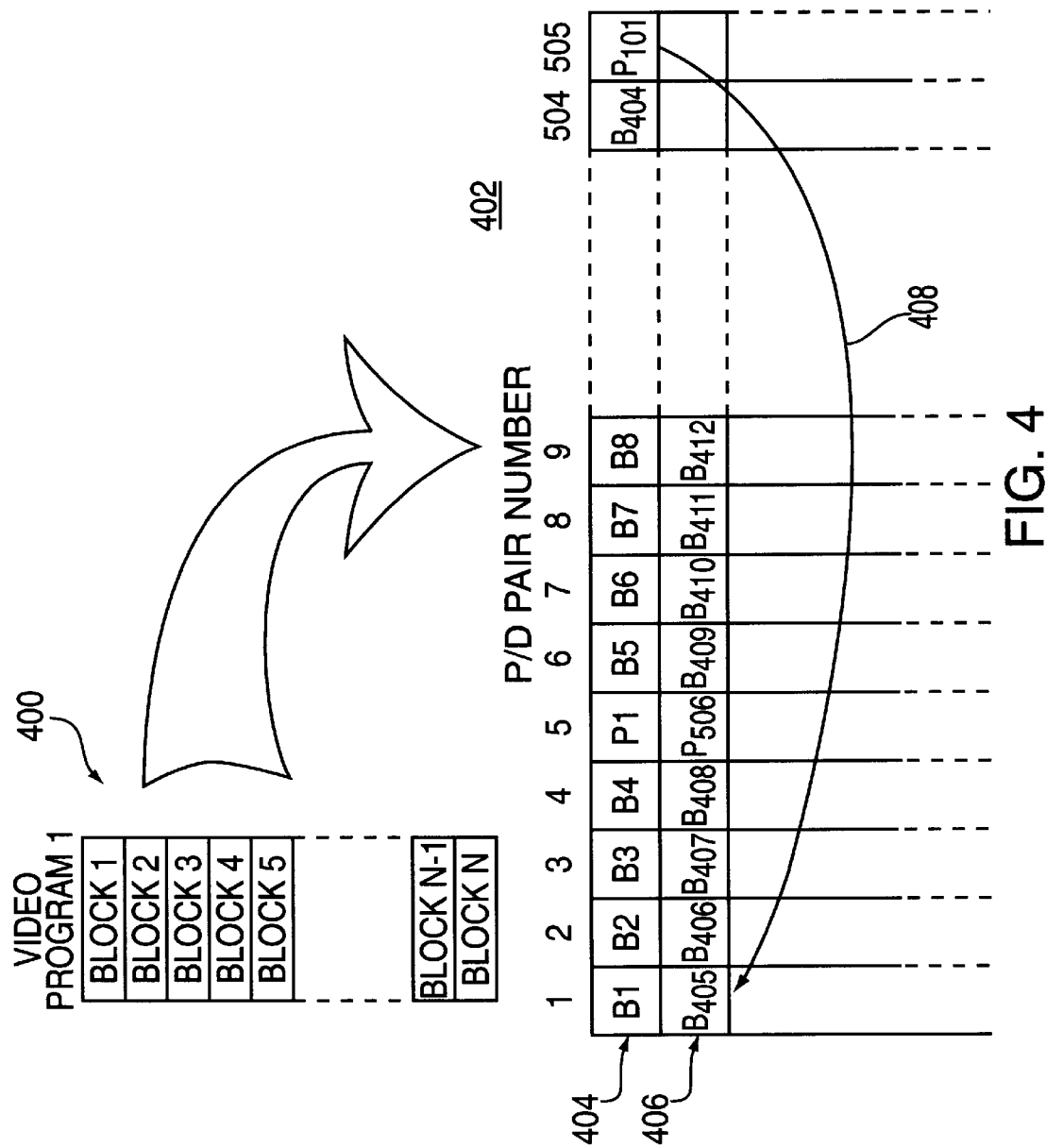
FIG. 4 is a data storage map for illustrating a preferred process for storing data in a disk drive array of the data distribution system of FIG. 2.

In operation, once information is retrieved as a serial data stream from mass storage 202, the host computer 204 instructs the controllers $216_n$ to store the information in the disk drive subsystems $224_n$ in a manner that is generally known in the art as "data striping". Specifically, the information is stored, one 329 kbyte block (or extent) at a time, amongst a plurality of disk drives in a striped pattern. For example, as shown in the storage map 402 of FIG. 4, the data stream 400 is data striped across 505 disk drives in a manner that will facilitate low access latency. For the following discussion of a preferred data striping technique, it is assumed there are four sets of 128 parallel processors (512 total of which 505 are used for video data storage) associated with 512 disk drives. The disk drives are consecutively numbered from 1 to 512. To store the data, the 505 disk drives are evenly divided into subsets of disk drives, e.g., five disk drives per subset. A portion of the video program is stored, in a striped pattern, across the array of 505 disks. A first stripe is shown as reference 404. As such, disk drive 1 stores the first 329 kbyte block (block 1) of input data 400, drive 2 stores block 2, drive 3 stores block 3, drive 4 stores block 4, and drive 5 stores parity block 1 (P1). The parity block contains parity data for the previous four data blocks. The next four blocks (B5, B6, B7, and B8) are stored on disks 6, 7, 8, and 9. The parity block P2 for blocks B5, B6, B7, and B8 is stored in drive 10. This foregoing process is repeated to disk 505, then the process begins again at the first drive (following arrow 408) to form the next stripe 406. This process, striping data across the drives is repeated until the entire video file is stored across the array. Included in the video file is a regular play track, a fast forward track and a rewind track.

The foregoing data striping discussion assumed, for simplicity, that data was stored in one subset of disk drives at a time. However, to efficiently utilize the parallel processing computer, input data is stored simultaneously using all the processors and disk drives, e.g., all 505 processors and disk drives. To facilitate this simultaneous storage, the data formatting circuit (203 in FIG. 2) buffers the input data from the mass storage device 202 and outputs a serial stream of data to the input registers 312 in an appropriate order. The specific order facilitates simultaneous storage of all the blocks in all the input registers.

Similarly, another video program file may be stored using this data striping method by starting storage of the second program with disk drives 6 through 10. Thereafter, the beginning of each program is offset from the beginning of a previously stored program by one subset of disk drives. As such, a plurality of video programs can be stored across the disk drives. Although one preferred manner for data striping the disk drives is described above, those skilled in the art will realize that other data striping methods can be used with the invention. Thus, the preferred method of data striping should not be construed as limiting the invention, but rather should be considered an illustrative method of data striping.

Also, for the following discussion, it is assumed that the input data stream contains parity blocks to facilitate error correction. Illustratively, the parity blocks are derived from the four preceding data blocks, e.g., the parity block is a bit-by-bit exclusive-OR of the bits in the four preceding data blocks. Thus, every fifth block is a parity word and, as such, every fifth disk drive contains the parity block for the previous four data blocks. Alternatively, if the parity blocks are not contained in the input data, they can be generated and inserted in the data stream as the data is stored in the digital information server. Also, the parity blocks can be derived from data from any number of disk drives, i.e., the parity group may be of any size.

Once the requested information (video program file) is resident on the disk drives, the user can request that the information be sent from the disks to the user's network. For example, by manipulating a command device (not shown), a command is sent from the user to the command interface (206 of FIG. 2). Using the command device, the user can select information, play, reverse, fast-reverse, fast-forward, fast-fast-forward, pause or stop the playback of the information. For example, if the information is a selected multimedia stream, the user may select a specific multimedia stream from a menu on their television screen. Once the multimedia stream is selected, the user controls the playback of the multimedia stream as if they were using a conventional video cassette player. In the simplest function, a user selects play and the multimedia stream is recalled from the disk drives by the parallel processors using a ACCESS/OUTPUT routine that is described below with respect to FIG. 6. The data is transferred to the multiplexing circuit via the I/O circuitry. As described above with respect to FIG. 2, the multiplexing circuit formats the data in a multiplexed manner such that a number of users can be connected to the system.

Using the data distribution system discussed above, multiple users can simultaneously access the same or different information. Additionally, these users can access information at anytime and review it at a number of speeds, e.g., pausing, fast-forwarding, or reversing as desired. Thus, the data distribution system forms a central database, e.g., a video database, that can be accessed as if each user had the entire database in their home. The system accomplishes such information accesses with unnoticeable delay.

Figure 5:
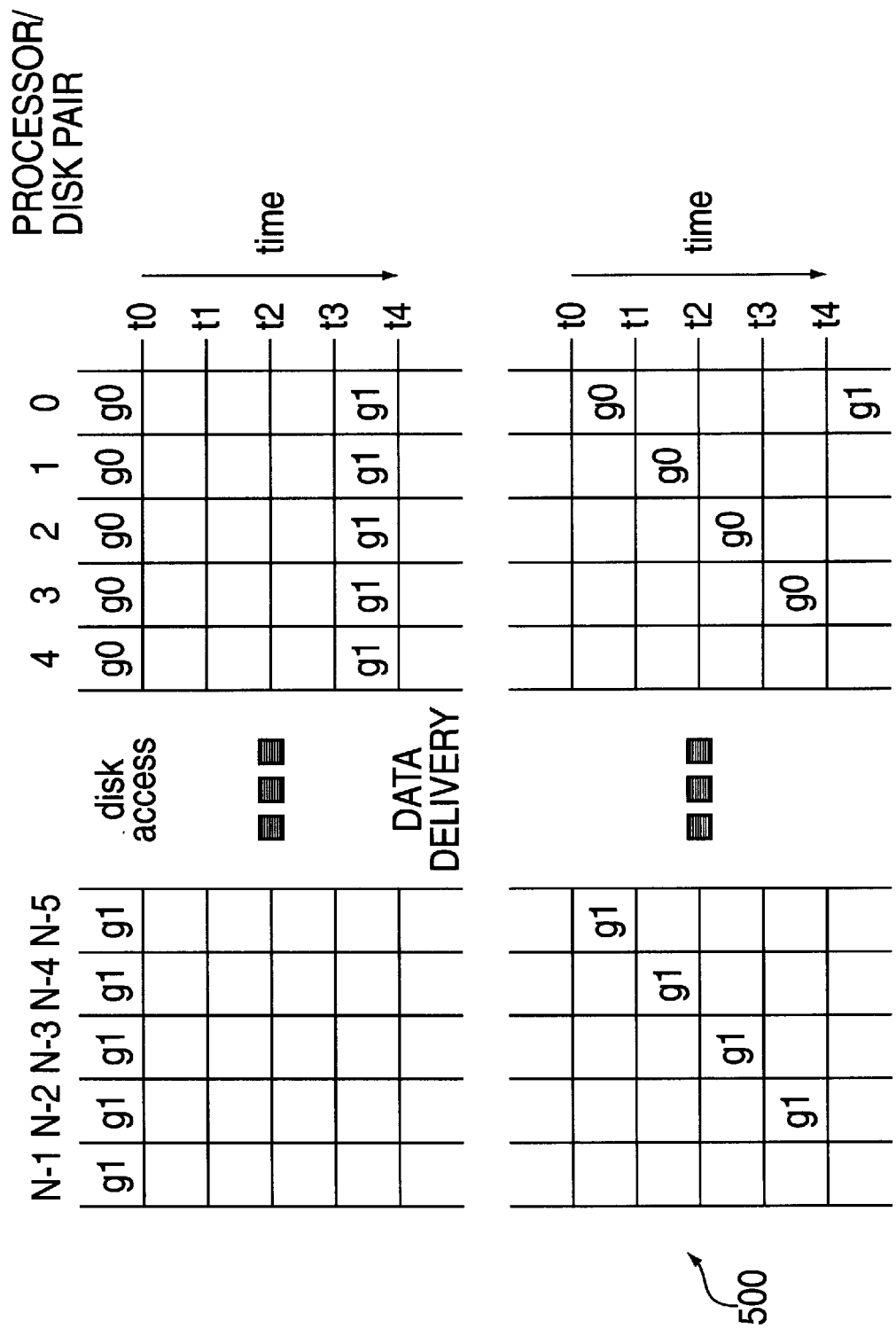
FIG. 5 is a data access map for illustrating a preferred process for retrieving data and distributing data stored in the disk drive array.
Figure 6:
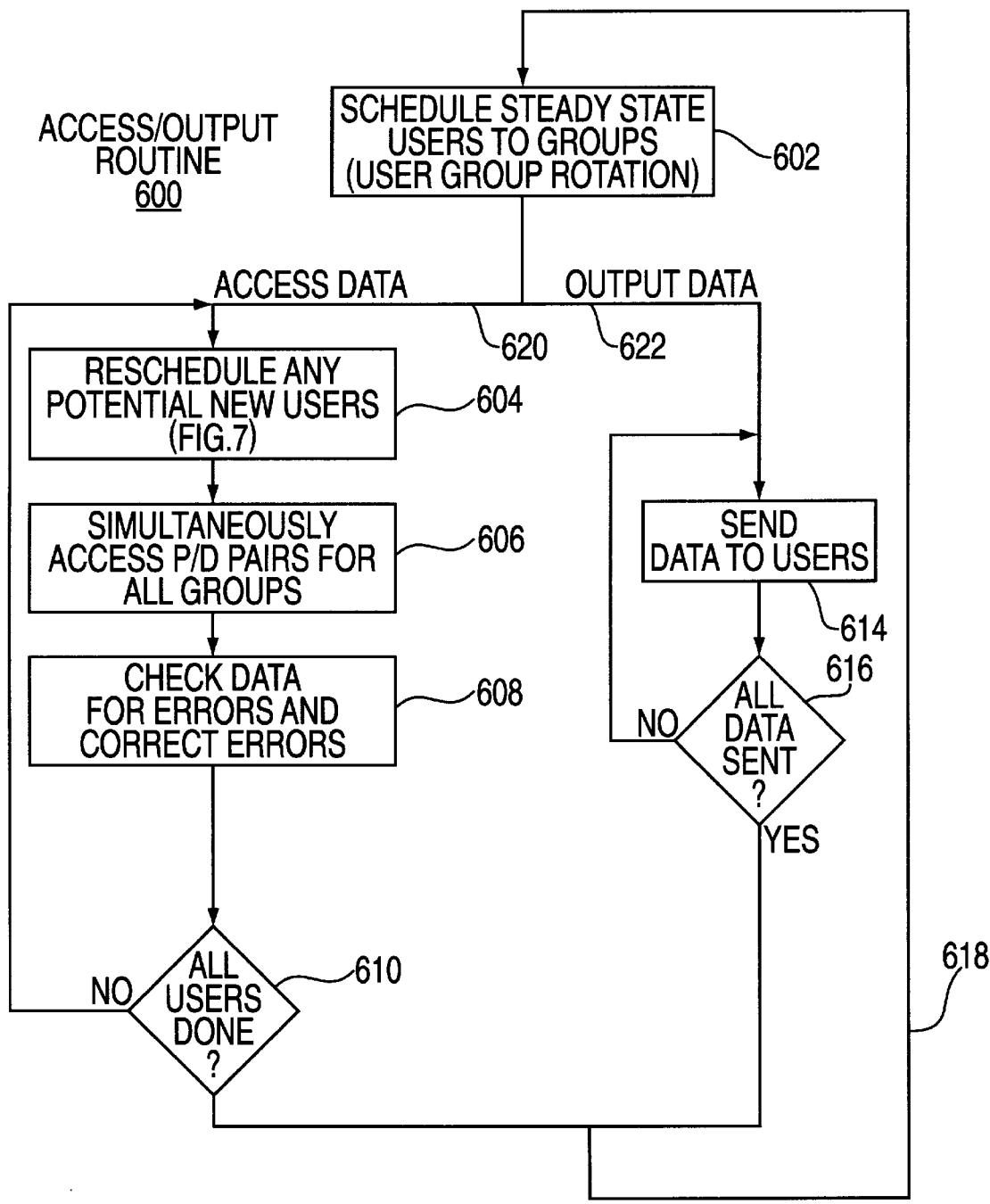
FIG. 6 depicts a flow diagram of a ACCESS/OUTPUT routine executed by the data distribution system shown in FIG. 2.

FIG. 5 depicts a data map 500 used to transfer requested data streams from the disk drives, through the processors, and, ultimately, to the users. The data map 500 represents the operation of the invention during steady state operation, i.e., streaming video to users. FIG. 6 is a flow diagram of an ACCESS/OUTPUT routine 600 that represents the process of the invention as the invention operates to fulfill user data requests. To best understand the operation of the invention, the reader should refer simultaneously to both FIGS. 5 and 6.

The routine 600 begins at step 602 for the beginning of each service period, i.e. a time period during which one extent of data is output to a given user from a given P/D pair. If the extent size is B and the bitrate for a single output stream is R, the service period is B/R. For example, if the extent size is 500 kbytes and the output stream bitrate is 4 Mbit/sec, the service period is 1.024 seconds. In step 602, a user that has received data during a previous service period (a steady state user) is assigned to an output user group, and also potentially to a disk access user group. An output user group is a plurality of U users that simultaneously (in a time-multiplexed manner) output U different extents of data from U buffers in the same processor within a single service period. A disk access user group is a group of users that all read an extent of data from each of the 5 disks in a parity group within the same service period. Note that both an output user group and a disk access user group have the same maximum size (e.g. at most 10 users), but that an output user group exists only on one P/D pair, while a disk access user group exists across all P/D pairs in a parity group (e.g. across 5 P/D pairs). At step 602 (which forms the boundary between service periods), each output user is rotated to the next P/D pair. This rotation of a user through the carousal of P/D pairs is the basis for supplying a user with a continuous stream of properly ordered data.

The specific algorithm 602 for rotating steady state users to their new output and disk access groups is the following: a user is always rotated to the output group on the next processor, and if that new output processor is the last output processor of a parity group (e.g. the fourth of five processors in a parity group), the user is also entered into the disk access group in the next (following) parity group. This is demonstrated in FIG. 5, where two parity groups of the full P/D carousal are shown: the first parity group with P/D pairs numbered 0–4 (P/D pair 4 is for parity only, not for output), and the last parity group, numbered N-5 to N-1 (where P/D pair N-1 is for parity only). In the service period between times t0 and t1, the users in output group g0 output their data from P/D pair 0, and those in group g1 output their data from P/D pair N-5. At time t1, algorithm 602 is performed to rotate the g0 users to the output user group on P/D pair 1, and the g1 users to P/D pair N-4. In the subsequent service period between times t1 and t2, these users output from their new output processors. This continues until time t3, when the algorithm 602 rotates the g0 users from processor 2 to 3, and the g1 users from processor N-3 to N-2. Since each of these new processors is the last output processor in their respective parity groups, the users are also scheduled into the disk access group on the following parity group of 5 processors. This is shown in FIG. 5 where the group g1 users do their disk accesses from P/D pairs 0–4 during the service period between times t3 and t4. [The cyclic nature of the P/D carousal means that parity group 0–4 follows parity group (N-5)–(N-1).] In summary, in the steady state (and for a parity group size of "G" P/D pairs), the users rotate their output from processor to processor every service period (skipping parity-only processors in the process), while the users rotate their disk access from parity group to parity group every G-1 service period. The synchronization is such that a disk access is accomplished from a certain parity group during the service period that the user's output is occurring on the last data processor of the previous parity group.

Figure 7:
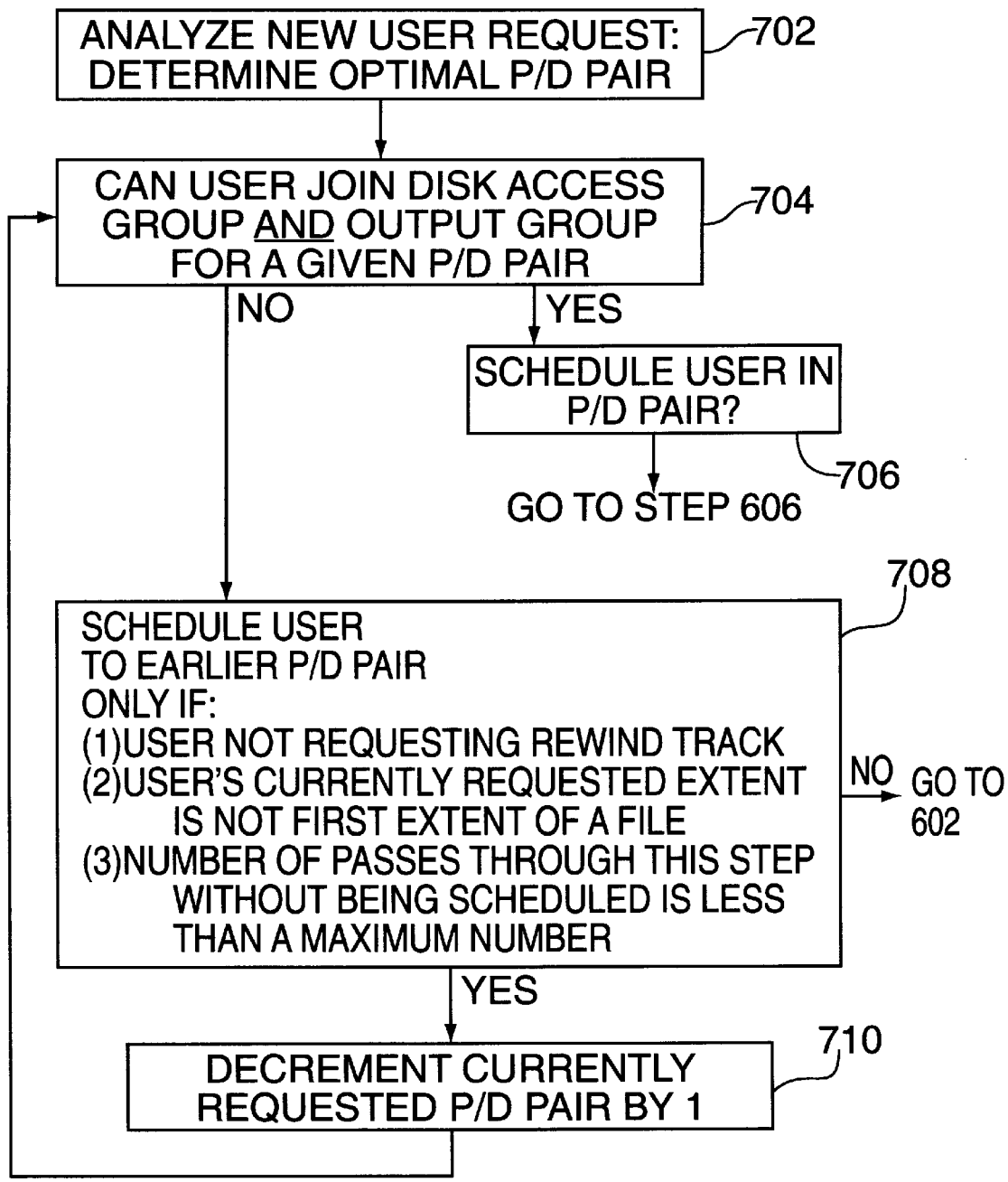
FIG. 7 depicts a flow diagram of a NEW USER SCHEDULING routine executed by the data distribution system shown in FIG. 2.

Apart from the steady state user rotation 602 that occurs at service period boundaries, FIG. 6 also shows the other major aspects of user scheduling that occurs in the server. If there are a maximum of U users in a user group, the loop through processes 604–610 occurs U times in a given service period. This disk access loop begins with process 604, which schedules in any new (non steady state) users. Such users may be users requesting an output stream from the server for the first time, or they may be users who requested a jump in the position of their current stream (such as a "fast-forward" request for a video stream). FIG. 7 presents the details of this process 604. Process 606 is where every P/D pair performs a single disk access for each user in a parity group, moving one extent of data from each disk to a DRAM buffer in the disk's corresponding processor. In a RAID-3 scheme, if the parity group consists of G disks, then a given user will read (G-1) extents of data from the first (G-1) disks in the parity group, and one extent of parity data from the last disk in the parity group. In process 608, each processor potentially corrects the newly buffered extent of data from parity, if a single disk error occurred in the parity group during the disk read. Occurring simultaneously with this disk access loop 604–610, is the data output process 614–616, where, in a single service period, a maximum of U users simultaneously output (in a time-multiplexed manner) a different extent of data from their DRAM buffers on each processor. This process completes (at the very end of the service period) when the last byte of data is output from each user's buffers. It is required that the loop 604–610 over (possibly) U disk accesses completes before the output process 614–616 completes. The next service period then begins with a new steady state user rotation process 602.

To minimize the amount of DRAM required for buffering data on each processor, a circular buffering scheme can be employed. According to the steady state user rotation algorithm 602, a user requires a buffer one extent large on each of the G processors of a single parity group for a total of G service periods at a time. Thus, although only U users can output from a processor at a time, the processor must have sufficient DRAM buffering to hold GU extents of data. If the server consists of a carousal of N P/D pairs grouped into RAID-3 parity groups of size G, and each processor can support up to U output users, then the server can support a total of (G-1)NU/G users. If each extent is of size B, then the server must have a total of GUNB of DRAM buffering. As an example, consider a N=250 processor server with parity groups of G=5, where up to U=10 users can share a given user group, reading and outputting extents of size B=500 kbytes. In this case the server can support 2000 users, and must contain 6.25 gigabytes of DRAM buffering.

Figure 8:
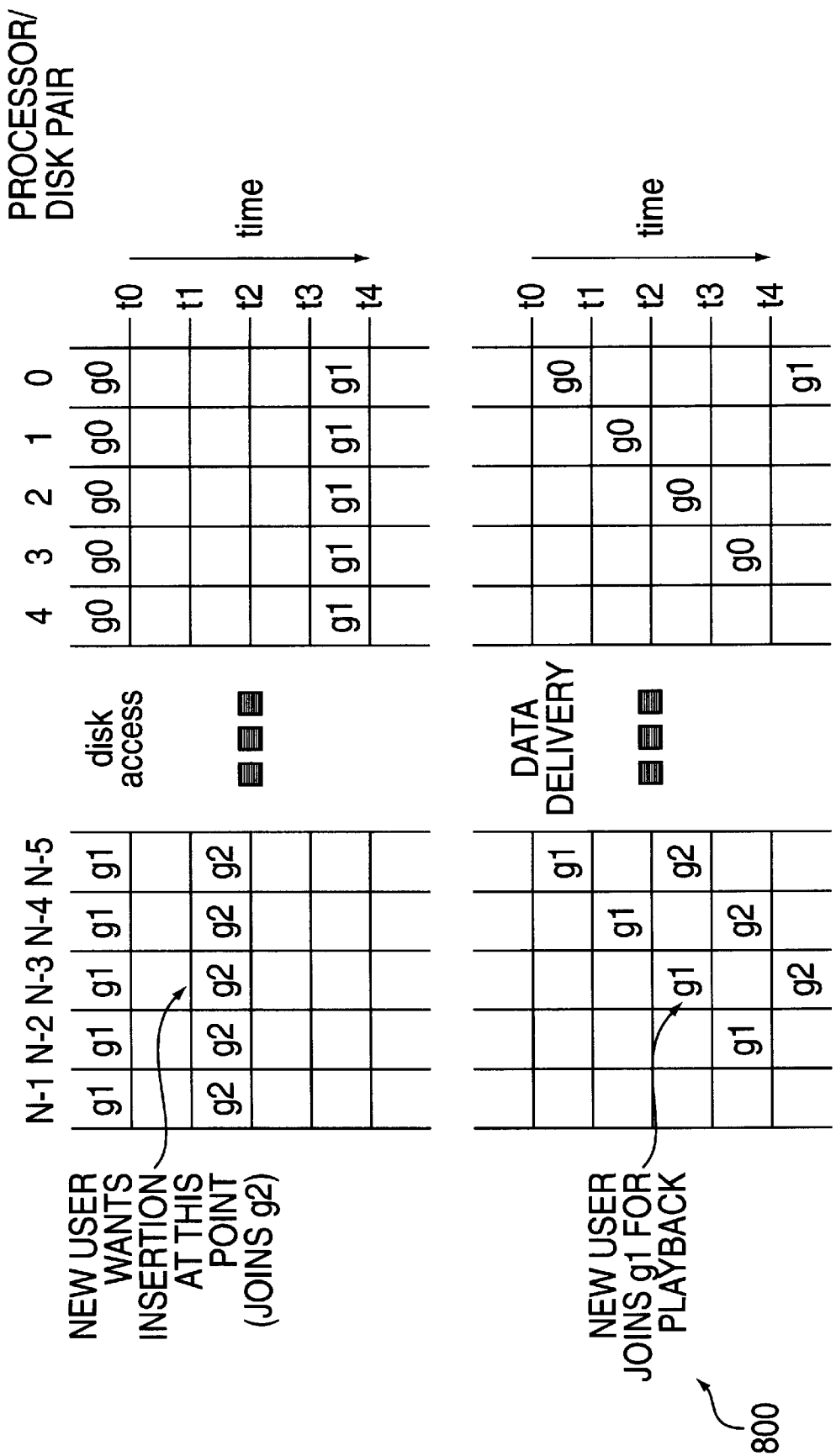
FIGS. 8, 9, and 10 depict data access maps for illustrating a process for retrieving and distributing data to new users of the data distribution system shown in FIG. 2.
Figure 9:
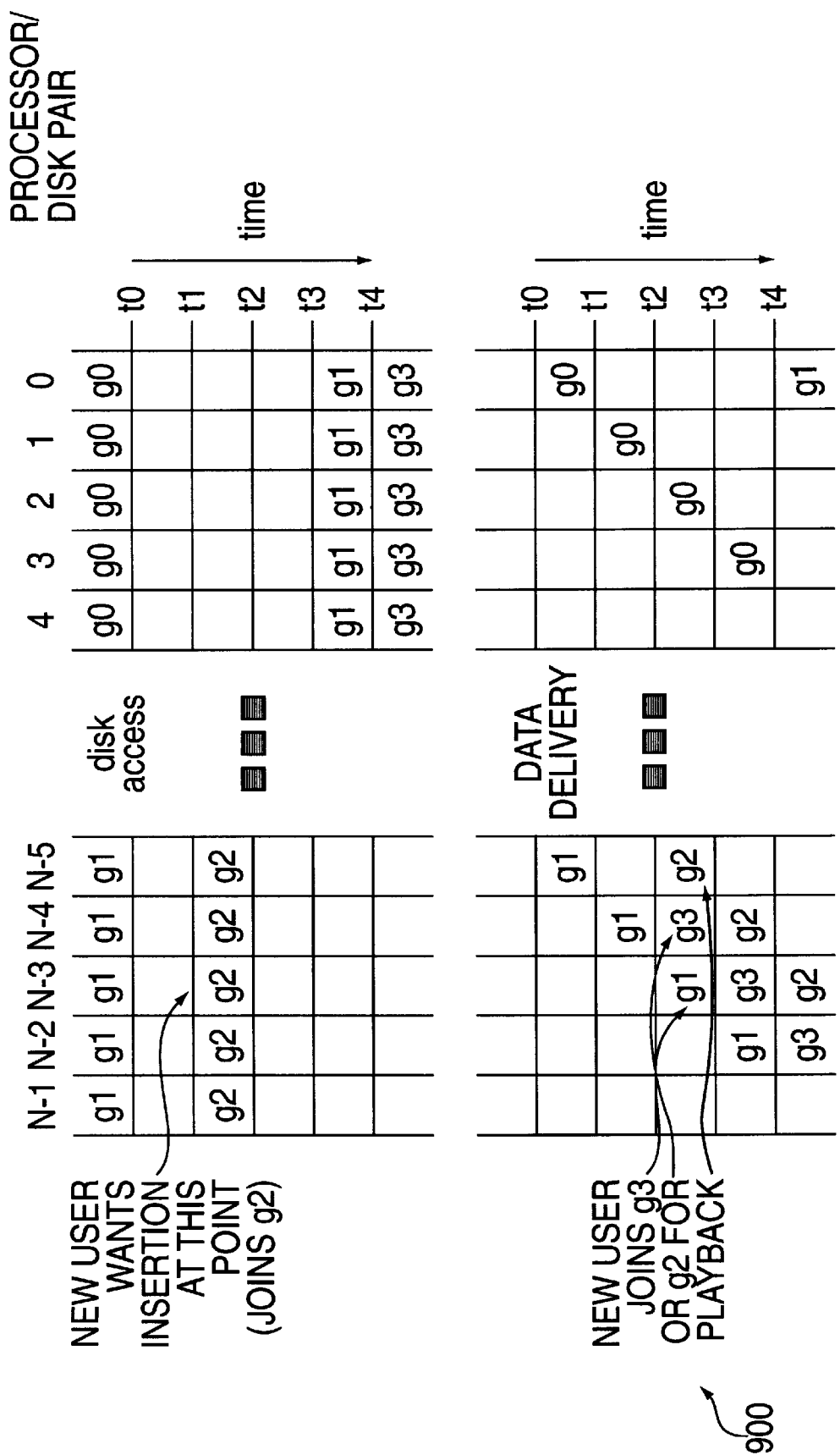
Figure 10:
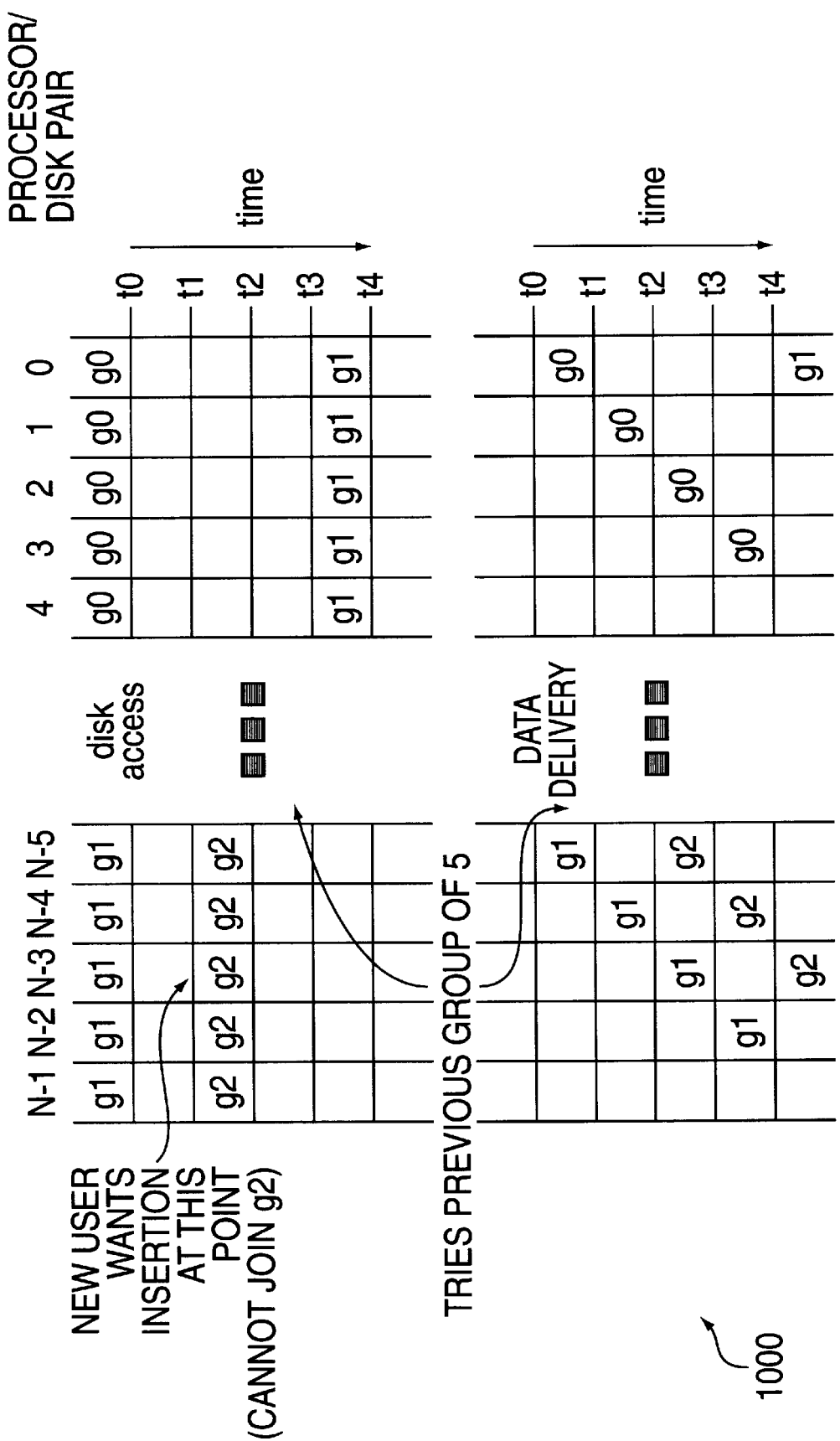

FIG. 7 depicts a flow diagram of a routine 700 that schedules new users requesting information that is not regarded as a steady state operation. FIGS. 8, 9 and 10 depict various access scenarios that are handled by routine 700. To best understand the operation of the invention, the reader should refer simultaneously to FIGS. 7, 8, 9 and 10.

Routine 700 begins at step 702, when a non steady state user request is detected. Such a request could come from either the start of a new user on the server, or from an existing user requesting transmission of data which differs from what the user's steady state playback would transmit. Such a jump request might come in the case of a server transmitting video streams, with the "normal", "fast-forward" and "rewind" tracks being physically different files. In such a case, a normal to fast-forward request would likely cause a jump in the user's next output P/D pair. In step 702, the new user request is analyzed to determine which disk contains the data the user has requested, and which output user group and disk access user group the user should join to transmit this data with minimal delay. This decision is demonstrated in FIG. 8, where between times t1 and t2, a user has requested to start playback of data existing on disk N-3. Process 702 determines that disk access group g2 is accessing the parity group that disk N-3 exists in, so that the user should join disk access group g2. Users in that group, however, would begin playback from disk N-5 at time t2, and would not playback data on disk N-3 until time t4. To deliver a data stream nearest to the user's requested start position, and to minimize the latency delay for fulfillment of the user's request, the user should join the output group g1, as this group of users will begin outputting data from disk N-3 at time t2. Step 704 of FIG. 7 determines if the user can indeed enter both these groups. If the determination is affirmative, in step 706 the user is scheduled into disk access g2 immediately, and into output user group g1 at time t2.

If the user cannot enter the optimal disk access and output user groups in step 704, the invention allows for a slight alteration of the start position of the user's outputted data stream, in order to transmit a data stream with minimal latency delay. In some applications, this option may not be desirable, as the start position of the user's data stream may be of critical importance. In other applications, such as a video server, minimizing the latency delay of a user's request may be of higher priority than delivering an exact video start position (as long as the delivered start position differs from the requested one by less than a few seconds of video). In such cases, processes 708–710 can be performed to minimize user request latency.

In this case, step 708 is performed to assess whether an adjacent earlier extent of data may be transmitted to the user with no delay. In the case of a video server, this request might be denied if the requested track type is a rewind track, or if the currently requested extent is at the file start, or if the currently requested extent has already been shifted a maximal tolerable amount from the originally requested extent. If the request is rejected, the user's transmission request will be delayed until the next service period, when step 704 can be re-attempted after the steady state user rotation has been done. If the assessment 708 is positive, the user's requested output P/D pair is decremented by one, and the assessment 704 is redone.

FIGS. 9 and 10 present two examples of this process of altering slightly the start position of the user's requested data stream. The figures present the same user request as was demonstrated in FIG. 8. In FIG. 9, process 704 determines that the user can get into disk access group g2 between times t1 and t2, but is unable to enter output group g1 at time t2. The output P/D pair is thus decremented from N-3 to N-4, and assessment 704 is redone with this new output P/D pair. Step 704 determines that in this case, output user group g3 will be outputting data from processor N-4 starting at time t2, and that this group is not full. The user then proceeds (through step 706) to read from parity group N-5 to N-1 in disk access group g2 between times t1 and t2, and to output data starting on processor N4 at time t2. The user's transmitted output stream thus begins one extent earlier in the data stream than the user requested. In the example of FIG. 10, step 704 denies the user's original request because disk access group g2 is full. The output P/D pair is thus decremented until it exists in the previous parity group (processors N-10 to N-6). Step 704 is then performed to assess whether the user can read from those 5 disks between times t1 and t2, and whether the user can begin output from processor N-7 at time t2. If this assessment is positive, the user will begin playback of data starting on P/D pair N-7, which is 3 extents earlier in the data stream than the user originally requested. In the case of video output streams, if the service period is 1 second long, this would equate to transmitting to the user a video stream that begins 3 seconds earlier into the data stream than requested.

Although various embodiments, which incorporate the teachings of the present invention, have been shown and described in detail herein, those skilled in the art can readily devise many other varied embodiments that still incorporate these teachings.

What is claimed is:

1. A method of accessing an array of storage devices comprising the steps of:

analyzing a data request from a user to determine the optimal storage device from which data should be retrieved;

assigning the user to a first group of users that will access the optimal storage device in a first time period;

retrieving data to fulfill said data request from the optimal storage device;

buffering said data in a buffer;

assigning the user to a second group of users that will be supplied data from the buffer in a second time period; and retrieving said data from said buffer and transmitting said data to the user to fulfill said data request.

2. The method of claim 1 wherein the first group of users is rotated to a next storage device to form said second group.

3. The method of claim 1 wherein said retrieving step further comprises the steps of:

simultaneously accessing data from a plurality of storage devices, where said data includes error correction information;

checking the accessed data for errors; and if an error is detected, correcting the error.

4. The method of claim 1 further comprising the steps of:

determining if a user is a new user; and scheduling said new user to access an optimal storage device.

5. The method of claim 4 wherein said scheduling step comprises the steps of:

determining whether the new user can be assigned to the first group of users,
      if the user can be assigned, assigning the user to the first group of users;
      if the user cannot be assigned to the first group of users, assigning the user to another group of users that will access data during the first time period, where said data is not accessed from the optimal storage device.

6. The method of claim 5 further comprising the steps of:

determining whether the new user can be assigned to the second group of users,
      if the user can be assigned, assigning the user to the second group of users;
      if the user cannot be assigned to the second group of users, assigning the user to another group of users that will access data during the second time period, where said data was not accessed from the optimal storage device.

7. The method of claim 1 further comprising the steps of:

identifying a new user;

determine an optimal storage device;

query whether the new user can join a disk access group and an output group for the optimal storage device;

if so, schedule the new user to access the optimal storage device;

if not, query whether the new user can be scheduled to a less than optimal storage device;

if so, schedule the user to access the less than optimal storage device; and if not, do not schedule the new user during a present time period.

8. The method of claim 7 wherein the less than optimal storage device is a storage device containing data that is temporally earlier than the data that is stored on the optimal storage device.

9. The method of claim 1 wherein the data is a video stream that has been divided into blocks and stored across a plurality of storage devices.

10. In a video on demand server comprising a plurality of parallel processors that are each connected to a storage device, where each storage device contains a block of data that represents a portion of a video stream, a method of accessing the storage devices comprising the steps of:

analyzing a data request from a user to determine the optimal storage device from which data should be retrieved;

assigning the user to a first group of users that will access the optimal storage device in a first time period;

retrieving data to fulfill said data request from the optimal storage device;

buffering said data in a buffer coupled to each processor;

assigning the user to a second group of users that will be supplied data from the buffer in a second time period; and retrieving said data from said buffer and transmitting said data to the user to fulfill said data request.

11. The method of claim 10 wherein a plurality of users are simultaneously assigned to said first group of users and the plurality of users simultaneously access said plurality of storage devices.

12. The method of claim 10 wherein the first group of users is rotated to a next storage device to form said second group of users.

13. The method of claim 10 wherein said retrieving step further comprises the steps of:

simultaneously accessing data from a plurality of storage devices for a given user, where said data includes error correction information;

checking the accessed data for errors; and if an error is detected, correcting the error.

14. The method of claim 10 further comprising the steps of:

determining if a user is a new user; and scheduling said new user to access an optimal storage device where data is stored that provides continuous video information to the new user.

15. The method of claim 14 wherein said scheduling step comprises the steps of:

determining whether the new user can be assigned to the first group of users, if the user can be assigned, assigning the user to the first group of users;

if the user cannot be assigned to the first group of users, assigning the user to another group of users that will access data during the first time period, where said data is not accessed from the optimal storage device.

16. The method of claim 15 further comprising the steps of:

determining whether the new user can be assigned to the second group of users, if the user can be assigned, assigning the user to the second group of users;

if the user cannot be assigned to the second group of users, assigning the user to another group of users that will access data during the second time period, where said data was not accessed from the optimal storage device.

17. The method of claim 10 further comprising the steps of: identifying a new user;

determine an optimal storage device;

query whether the new user can join a disk access group and an output group for the optimal storage device;

if so, schedule the new user to access the optimal storage device;

if not, query whether the new user can be scheduled to a less than optimal storage device;

if so, schedule the user to access the less than optimal storage device; and if not, do not schedule the new user during a present time period.

18. The method of claim 17 wherein the less than optimal storage device is a storage device containing data that is temporally earlier than the data that is stored on the optimal storage device, where the user will not receive a continuous stream of video information.

19. Apparatus for accessing an array of storage devices comprising:

means for analyzing a data request from a user to determine the optimal storage device from which data should be retrieved;

means for assigning the user to a first group of users that will access the optimal storage device in a first time period;

means for retrieving data to fulfill said data request from the optimal storage device;

means for buffering said data in a buffer;

means for assigning the user to a second group of users that will be supplied data from the buffer in a second time period; and means for retrieving said data from said buffer and transmitting said data to the user to fulfill said data request.

20. The apparatus of claim 19 wherein the first group of users is rotated to a next storage device to form said second group.

21. The apparatus of claim 19 wherein said means for retrieving further comprises:

means for simultaneously accessing data from a plurality of storage devices, where said data includes error correction information;

means for checking the accessed data for errors and, if an error is detected, correcting the error.

22. The apparatus of claim 19 further comprising:

means for determining if a user is a new user; and means for scheduling said new user to access an optimal storage device.

23. The apparatus of claim 22 wherein said means for scheduling comprises:

means for determining whether the new user can be assigned to the first group of users, if the user can be assigned, assigning the user to the first group of users;

if the user cannot be assigned to the first group of users, assigning the user to another group of users that will access data during the first time period, where said data is not accessed from the optimal storage device.

24. The apparatus of claim 23 further comprising:

means for determining whether the new user can be assigned to the second group of users,
  if the user can be assigned, assigning the user to the second group of users;
  if the user cannot be assigned to the second group of users, assigning the user to another group of users that will access data during the second time period, where said data was not accessed from the optimal storage device.

25. The apparatus of claim 19 further comprising:

means for identifying a new user;

means for determining an optimal storage device;

means for querying whether the new user can join a disk access group and an output group for the optimal storage device;

if so, schedule the new user to access the optimal storage device;

if not, query whether the new user can be scheduled to a less than optimal storage device;

if so, schedule the user to access the less than optimal storage device; and if not, do not schedule the new user during a present time period.

26. The apparatus of claim 25 wherein the less than optimal storage device is a storage device containing data that is temporally earlier than the data that is stored on the optimal storage device.

27. The apparatus of claim 19 wherein the data is a video stream that has been divided into blocks and stored across a plurality of storage devices.

28. A computer readable medium containing a computer program that, when executed by a computer, causes the computer to perform a method of accessing an array of storage devices comprising the steps of:

analyzing a data request from a user to determine the optimal storage device from which data should be retrieved;

assigning the user to a first group of users that will access the optimal storage device in a first time period;

retrieving data to fulfill said data request from the optimal storage device;

buffering said data in a buffer;

assigning the user to a second group of users that will be supplied data from the buffer in a second time period; and retrieving said data from said buffer and transmitting said data to the user to fulfill said data request.

29. The medium of claim 28 wherein the first group of users is rotated to a next storage device to form said second group.

30. The medium of claim 28 wherein said retrieving step of said method further comprises the steps of:

simultaneously accessing data from a plurality of storage devices, where said data includes error correction information;

checking the accessed data for errors; and if an error is detected, correcting the error.

31. The medium of claim 28 further causing the computer to perform the steps of:

determining if a user is a new user; and scheduling said new user to access an optimal storage device.

32. The medium of claim 31 wherein said scheduling step of said method comprises the steps of:

determining whether the new user can be assigned to the first group of users,
  if the user can be assigned, assigning the user to the first group of users;
  if the user cannot be assigned to the first group of users, assigning the user to another group of users that will access data during the first time period, where said data is not accessed from the optimal storage device.

33. The medium of claim 32 further causing the computer to perform the steps of:

determining whether the new user can be assigned to the second group of users,
  if the user can be assigned, assigning the user to the second group of users;
  if the user cannot be assigned to the second group of users, assigning the user to another group of users that will access data during the second time period, where said data was not accessed from the optimal storage device.

34. The medium of claim 28 further causing the computer to perform the steps of:

identifying a new user;

determine an optimal storage device;

query whether the new user can join a disk access group and an output group for the optimal storage device;

if so, schedule the new user to access the optimal storage device;

if not, query whether the new user can be scheduled to a less than optimal storage device;

if so, schedule the user to access the less than optimal storage device; and if not, do not schedule the new user during a present time period.

35. The medium of claim 34 wherein the less than optimal storage device is a storage device containing data that is temporally earlier than the data that is stored on the optimal storage device.

36. The medium of claim 28 wherein the data is a video stream that has been divided into blocks and stored across a plurality of storage devices.

* * * * *